United States Patent Office 2,819,949
Patented Jan. 14, 1958

2,819,949

PURIFICATION OF HYDROGEN PEROXIDE

William R. Keeler and Roy J. Evans, Berkeley, and Gino J. Prerotti, El Cerrito, Calif., assignors to Shell Development Company, Emeryville, Calif., a corporation of Delaware Application January 19, 1953, Serial No. 331,784

7 Claims. (Cl. 23—207)

This invention relates to a process for the recovery and purification of hydrogen peroxide from mixtures containing hydrogen peroxide and organic impurities. More particularly, the invention relates to a process for the recovery and purification of hydrogen peroxide initially present in solution with oxygenated organic materials having in the presence of hydrogen peroxide divergent volatilities and also divergent stabilities relative both to each other and to hydrogen peroxide.

Forming a part of the present specification are the drawings wherein.

Figure 1:
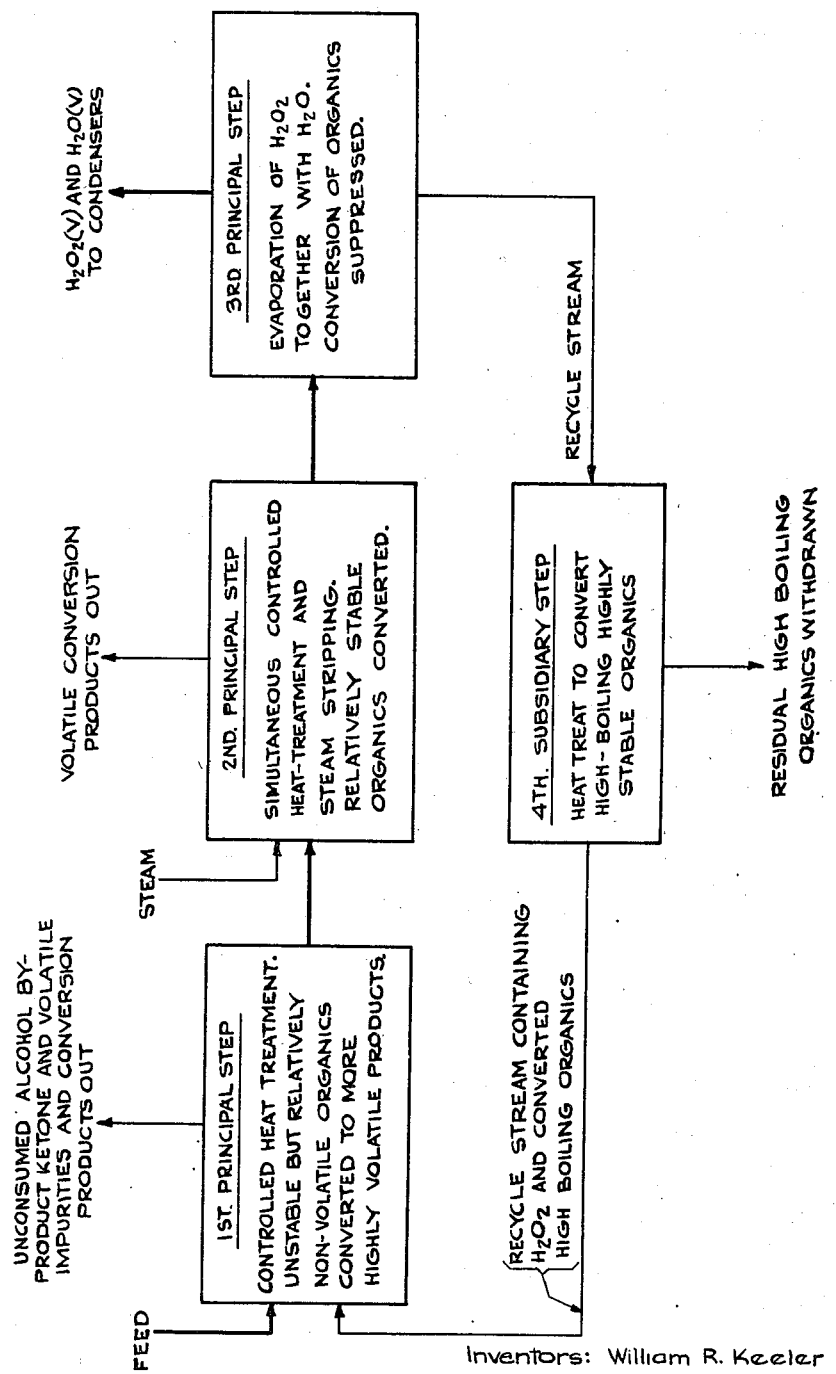
Figure 1 represents a graphic outline of the process of the invention.

Conventionally hydrogen peroxide is produced by the electrolytic process and to a lesser extent by the barium peroxide process. In the former of these processes an aqueous bisulfate solution is anodized and the resulting persulfate solution is hydrolyzed and distilled to recover the hydrogen peroxide. In the barium peroxide process, barium peroxide is treated with a strong mineral acid, usually sulfuric acid, and barium sulfate is separated from the resulting solution of hydrogen peroxide by filtration or equivalent means. Aqueous solutions of hydrogen peroxide produced by either of these processes may be concentrated by appropriate distillation. Although the solution which is to be concentrated may contain small amounts of inorganic impurities, such as metal salts, which are removed incidental to the concentration of the hydrogen peroxide, organic impurities are characteristically absent. The problem of separating organic impurities from the hydrogen peroxide therefore is not involved.

It also is known to produce hydrogen peroxide by partial oxidation of selected aromatic organic intermediates, for example, para-azo-toluene and 2-ethylanthraquinhydrone. Hydrogen peroxide may be recovered from the products of the partial oxidation, as by washing, scrubbing or extracting the reaction mixture with water. The recovered hydrogen peroxide may contain as impurities small amounts of inert water-immiscible organic solvents used during the oxidation, traces of the aromatic starting material or of the aromatic product formed by its partial oxidation, as well as metal ions with which the solution may have become incidentally contaminated. Methods for purifying aqueous solutions of hydrogen peroxide thus prepared are known, based in part upon the water-immiscibility of the impurities and in part upon the fact that hydrogen peroxide and the various essentially inert impurities characteristic of these processes can be directly separated by suitable fractional distillation.

More recently there have been disclosed certain processes for the production of hydrogen peroxide by partial oxidation of alcohols, especially isopropyl alcohol and other lower, or water-soluble, secondary alkanols. In the production of hydrogen peroxide according to these processes there is obtained a mixture comprising unconsumed alcohol, ketone corresponding to the alcohol, in at least some cases organic peroxides, and hydrogen peroxide. There also are formed and are present in the mixtures small amounts of water-miscible oxygenated organic compounds of diverse chemical types, apparently as a result of side-reactions involving either or both the alcohol used as starting material and the ketone produced as by-product. Together with the organic peroxides these oxygenated organic compounds comprise materials of widely divergent volatilities, both with respect to one another and with respect to hydrogen peroxide, and widely divergent stabilities in the presence of hydrogen peroxide, especially under conditions normally encountered in distillation of aqueous systems. There is evidence that there are present inter alia aliphatic aldehydes, ketones, organic acids and esters thereof, and like relatively stable and relatively volatile water-miscible mono-functional oxygenated aliphatic compounds, as well as less volatile, higher oxygenated organic compounds including polyfunctional oxygenated organic compounds and polymers of organic peroxides. The amount of the oxygenated organic compounds which are present as impurities always is small. Typical crude oxidation products contain amounts of carbon present in the form of such oxygenated organic compounds equal to no more than about 5% by weight of the hydrogen peroxide, and more typically less than about 3% by weight of the hydrogen peroxide.

For certain industrial and military purposes it is essential to have concentrated (e. g., upwards from 80%) hydrogen peroxide which is characterized by high purity and especially by freedom from organic impurities. While simple distillation of the crude products prepared by partial oxidation of alcohols has been found to be adequate for separation of the major portion of the unconsumed alcohol and by-product carbonylic compound from the hydrogen peroxide, the distillatory methods heretofore employed have proven to be inadequate for freeing the hydrogen peroxide of the small amounts of other organic compounds normally present. A practical method for freeing the hydrogen peroxide of such small amounts of other organic compounds is one of the principal purposes of this invention.

*General statement of the invention*

It now has been discovered in accordance with the invention that, unlike the impurities which are present in aqueous solutions of hydrogen peroxide produced by the more conventional processes referred to hereinbefore, the oxygenated organic compounds which are formed in small amounts during the oxidation of lower secondary alcohols under conditions productive of hydrogen peroxide comprise oxygenated organic compounds which are capable of undergoing a diversity of chemical reactions in the presence of hydrogen peroxide under conditions encountered during distillation of aqueous systems. According to the invention, advantage is taken of this chemical reactivity of the impurities. By deliberately controlling, guiding, or directing the chemical reactions or conversions which tend to occur, and by deliberately causing desired reactions or conversions to take place, the impurities are converted to a form in which they are separable from hydrogen peroxide by practical methods, while loss of hydrogen peroxide by decomposition or reaction with the organic materials is avoided. The novel process of the present invention, therefore, is based in principle upon the effecting of a plurality of successive controlled partial degradations or conversions of oxygen-containing organic materials which are initially present in the solution. The degradations or conversions are so effected, controlled, or directed that material decomposition of the hydrogen peroxide is avoided while at the same time oxygenated organic compounds in a form separable from hydrogen peroxide by practical distillatory methods are produced or are retained as such in the mixture undergoing purification. Each successive degradation or conversion is accompanied or followed by a separation between the hydrogen peroxide and at least a portion of the degradation products or converted impurities. The novel process of the invention comprises three principal steps and a fourth, subsidiary step. Figure 1 of the drawings presents a schematic outline of the process wherein:

(1) In the first principal step the crude oxidation product, containing the by-product ketone and the unconsumed portion of the water-soluble secondary alcohol used as starting material, is subjected to a controlled heat treatment so as to convert at least a portion of the relatively unstable and relatively non-volatile oxygenated organic materials which are present to relatively more stable organic products having volatilities greater than that of water in the presence of the hydrogen peroxide and unconsumed alcohol, and distilling from the heat-treated crude product in the presence of water the unconsumed secondary alcohol and the by-product ketone together with water and at least a portion of said relatively more stable organic products. Mono-functional oxygenated organic impurities initially present and boiling somewhat higher than the alcohol-water azeotrope may be removed at the same time by virtue of the large enhancement in their volatilities relative to the volatility of the alcohol in the presence of water.

(2) In the second principal step relatively more stable but relatively non-volatile impurities remaining in the aqueous hydrogen peroxide solution which is obtained from the first step of the process, are degraded by further heat treatment, while continuously removing the degradation products, to yield as degradation products relatively stable organic products, having volatilities in the presence of hydrogen peroxide and water higher than that of the hydrogen peroxide. Concurrently with the heat treatment the relatively stable organic products are volatilized from the mixture, whereby the desired conversions are driven towards completion.

(3) In the third principal step a portion of the hydrogen peroxide together with water is vaporized from the remaining aqueous mixture while suppressing conversion of the remaining relatively non-volatile organic impurities to more volatile products. A vaporous fraction comprising hydrogen peroxide and water is separated from a liquid fraction comprising the relatively stable but relatively non-volatile impurities remaining, and the vaporized hydrogen peroxide is condensed to the liquid state.

(4) The liquid fraction obtained in the third principal step of the process will contain appreciable quantities of hydrogen peroxide. This hydrogen peroxide, which, it has been found, can be distilled from the non-volatile organic impurities contained in the liquid fraction only with great danger of detonation of the potentially explosive mixture, advantageously is recovered according to the invention in the fourth, subsidiary step. By subjecting said liquid fraction to a further and more severe heat treatment, there is effected substantial conversion of the relatively stable but relatively non-volatile organic impurities to more-volatile organic products. The thusly heat-treated liquid fraction then is recycled to a stage of the process at least as early in the process as the second principal step for recovery of the hydrogen peroxide and removal of the volatile organic products formed by the heat treatment. The heat treatment preferably is carried out while stripping the liquid fraction with steam so as to volatilize hydrogen peroxide and the volatile organic products formed by the heat-treatment, returning only the vaporized portion to the principal steps of the process, and withdrawing the non-vaporized fraction from the system.

The starting materials

The oxidation products from which hydrogen peroxide is recovered and purified according to the process of this invention generally contain, on an anhydrous basis, from about 25% to about 80% by weight of the secondary alcohol used as starting material for the oxidation, such as isopropyl alcohol, secondary-butyl alcohol, or other secondary aliphatic alcohol containing up to about five carbon atoms, from about 1% to about 30% by weight of hydrogen peroxide, and an amount of ketone produced by partial oxidation of the alcohol substantially stoichiometrically equivalent to the hydrogen peroxide. Organic peroxides may not or more usually may be present and when present the amount thereof may be as high as 75% or more of the hydrogen peroxide in terms of active or per-oxy oxygen. Other oxygenated organic compounds are generally present only in small amounts, usually between about 1% and about 5% by weight of the mixture on an anhydrous basis. Water may be present. Water, if initially present in lesser amounts, should be added to the oxidation product prior to the process of the invention in an amount sufficient to yield as bottoms product from the first principal step of the process an aqueous solution of hydrogen peroxide containing from about 5% to about 35%, preferably 10% to 30%, by weight of hydrogen peroxide. The unconsumed alcohol which is distilled off in the first principal step of the process distills as an azeotropic mixture with water. Therefore, the crude oxidation product, if it contains less water, should be diluted with water so that the diluted mixture contains an amount of water equal to that required for the alcohol-water azeotropic mixture plus an amount equal to from about 1.8 to about 19, preferably from about 2.3 to about 9, times the weight of the active oxygen expressed as hydrogen peroxide. The actual amount of water to be added in any particular case will, of course, depend upon the amount already present in the crude oxidation product and upon the amount of active oxygen and of alcohol contained in the crude product, and can be readily calculated for each specific case. A stabilizer for the hydrogen peroxide desirably is present. As the stabilizer there may be used any of the known stabilizers, or mixtures thereof, such as an alkali metal stannate, a pyrophosphate or other phosphate ion progenitor, 8-hydroxyquinoline, or the like. The stabilizer may be used in customary amounts. The amount of the stabilizer to be used may be initially incorporated in the feed to the processes, or it may be added incrementally at a plurality of points throughout the process.

The first principal step

In the first principal step of the process the crude oxidation product, containing hydrogen peroxide and organic components of the character hereinbefore defined is subjected to a controlled heat treatment, to convert relatively unstable but relatively non-volatile organic materials contained in the feed to relatively more volatile and stable organic products. At least a substantial portion of the relatively more volatile organic products thus formed, together with the unconsumed alcohol, by-product ketone, and relatively volatile organic impurities initially present, are volatilized and withdrawn from the heat treated mixture. The temperature which is employed for the heat treatment in the first principal step should be sufficiently elevated to cause the necessary chemical conversions to take place but not so high that excessive decomposition of the hydrogen peroxide, pyrolytically or by reaction with the various organic materials which are present, takes place. The temperature may be varied over the range of from about 75° C. to about 120° C., a preferred range being from about 85° C. to about 110° C. Depending upon the particular feed which is being purified, and upon the temperature, the duration of heat treatment may be varied from about 5 minutes to about 100 minutes although it preferably is maintained within the range of from about 10 minutes to about 30 minutes.

Although the heat treatment of the crude oxidation product and the distillation of the heat-treated product may be carried out successively, for example, by heating the crude liquid product in a heated time-tank or other suitable reactor and then fractionally distilling the heat-treated mixture under vacuum, it is preferred to conduct the heat treatment and the distillation simultaneously or concurrently; whereby the unconsumed alcohol and the by-product ketone are distilled overhead from the crude product and at the same time relatively unstable and relatively non-volatile organic materials are converted at least in part to relatively more volatile organic products which are vaporized from the mixture undergoing heat treatment substantially as fast as they are generated therein. Relatively volatile impurities initially present in the crude product also are distilled off at least in substantial part.

When carrying out the heat treatment and the distillation concurrently, the first principal step of the process is conducted by introducing a continuous stream of the crude oxidation product into a rectification column of practical size, such as a column equipped with grid trays, sieve trays, bubble-plate trays or their equivalents, said column being adapted to operation at the necessary temperatures (pressures) and holding time of the liquid feed in the column and its appurtenances, i. e., reboiler. The feed may be introduced into the column at an intermediate level thereof. A liquid portion of the feed flows downwardly through the column in countercurrent flow to vapors evolved from the descending liquid portion of the feed at lower levels of the column and an accumulated liquid portion of the feed maintained in a reboiler connected to the lower end of the column or formed within the lower end of the column. The vapors ascending through the column strip the alcohol and the by-product ketone from the descending liquid portion of the feed. Relatively non-volatile and unstable organic components of the feed are converted to more highly volatile organic products during passage of the liquid portion of the feed downwardly through the column and while held in the reboiler, and the relatively volatile products are stripped from the feed with the secondary alcohol and by-product ketone. In the upper portion of the column the ascending vapors are contacted under conditions of reboiling and refluxing with liquid condensate descending from higher levels of the column and from a reflux condenser system positioned within the upper end of the column or as an external appurtenance thereof, loss of hydrogen peroxide to the distillate fraction thereby being maintained at a minimum. In order to obtain optimum conversion of the relatively unstable relatively non-volatile oxygenated impurities to more highly volatile products the column should be operated at a maximum temperature (temperature at the reboiler) of at least 85° C. and preferably at least 90° C. Temperatures within the column and reboiler above about 120° C. should be avoided, else hydrogen peroxide be lost by pyrolytic decomposition and by reaction with the organic materials which are present, and temperatures within the column and reboiler of not over 105° C. are preferred. Depending upon the desired temperatures and upon the particular feed the pressure within the column may be atmospheric, moderately above atmospheric, or subatmospheric. With feeds prepared by oxidation of isopropyl alcohol the reboiler temperature advantageously is held between about 90° C. and 100° C., while the pressure, measured at the top of the column, should be maintained within the range of from about 400 to about 700 millimeters of mercury. The residence or holding time of the liquid portion of the feed within the column and reboiler (i. e., the residence time at the rectification temperatures) should exceed about 5 minutes in order to obtain adequate conversion, decomposition, or degradation of the relatively unstable impurities but should not exceed about 100 minutes since at the longer residence times loss of hydrogen peroxide by decomposition and by reaction with the organic materials which are present is encountered. The residence time preferably is maintained between 10 and 30 minutes. The residence or holding time is defined as equal to the quotient of the rate of feed to the column divided by the volume of the liquid portion of the feed in the column at any instant under steady operating conditions, consistent units naturally being used.

The distillate or overhead fraction from the fractionating column used in the first principal step of the process contains chiefly the unconsumed alcohol together with water in amounts at least sufficient to supply the requirements for the alcohol-water azetrope, and the by-product ketone. The ketone may be reconverted to alcohol by hydrogenation, with or without prior separation from the recovered unconsumed alcohol, and the alcohol recycled to the oxidation step for further oxidation productive of hydrogen peroxide.

The bottoms or liquid fraction from the distillation of the first principal step of the process is an aqueous solution of hydrogen peroxide containing from about 5% to about 35% by weight of hydrogen peroxide, at the most only traces of the unconsumed alcohol and of the by-product carbonylic compound, and, additionally, small amounts of relatively non-volatile and relatively stable oxygenated organic impurities. The amount of such impurities typically will be equivalent to less than about 2% of carbon based upon the weight of the hydrogen peroxide. Polyfunctional aldehydes, ketones, acids, and high molecular weight, probably polymeric, peroxides appear to account for a large portion of such impurities.

*The second principal step*

In the second principal step of the process the aqueous solution of hydrogen peroxide which is obtained as bottoms product from the first principal step is subjected to further heat treatment and simultaneously therewith is contacted with a large volume of steam, preferably in countercurrent continuous flow. Impurities of but intermediate volatility (i. e., boiling at temperatures above the boiling point of water but having volatilities at infinite dilution from water solution greater than the volatility of hydrogen peroxide) are vaporized from the solution through the action of the partial pressure effect of the steam and, although present in but small amounts, are efficiently separated from the hydrogen peroxide. At the same time, relatively non-volatile organic impurities, including high-boiling organic peroxides and polymeric organic peroxides are decomposed by the action of the heat and steam to yield relatively stable organic products of intermediate volatility (as defined above) and these products of intermediate volatility are removed as formed. The decomposition of the relatively non-volatile organic impurities involves at least in part chemical equilibria which, it has been found, can be displaced in the direction of desired decomposition by the continuous, concurrent removal of the organic decomposition products. A substantial reduction in the content of relatively non-volatile organic impurities thus is made in the second principal step. Loss of hydrogen peroxide in the second principal step is reduced to a minimum by scrubbing the steam, after the contact thereof with the aqueous solution of hydrogen peroxide, with liquid water. The liquid-water serves to extract by a refluxing action small amounts of hydrogen peroxide volatilized by or with the steam. The water containing the hydrogen peroxide thusly recovered from the steam is combined with the main body of aqueous hydrogen peroxide, which is subsequently conveyed to the third principal step of the process.

The second principal step of the process desirably is carried out by introducing the solution of hydrogen peroxide obtained from the first principal step of the process into a rectifying column maintained at temperatures between about 65° C. and about 100° C. at an intermediate level thereof and flowing the liquid feed downwardly through the lower portion of the column countercurrently to steam introduced near the bottom of the column and ascending therethrough.

The steam preferably is employed in excess, based upon the weight of the feed to the column. Weight ratios of steam to feed of from 0.4 to 5 are suitable and from 0.8 to 3 are preferred. Larger amounts of steam may be used, although the use of larger amounts tends to be uneconomic.

It is advantageous to operate the column at pressures moderately below atmospheric, although at excessively low pressures the temperature falls below a temperature conducive to the desired degradation of relatively non-volatile impurities. Absolute pressures of from about 200 to about 700 mm. of mercury are suitable, corresponding to temperatures for saturated steam of from about 66° C. to 97° C. A preferred pressure range is 400 to 700 mm. of mercury, corresponding to temperatures for saturated steam of from about 82° C. to about 97° C. The residence time of the liquid feed within the column should be sufficient to permit the desired degradation of the relatively non-volatile impurities but should be limited so as to avoid loss of hydrogen peroxide by thermal decomposition or by reaction with the organic materials which are present. The residence time should not exceed 90 minutes, and preferably should be not over about 60 minutes. The residence time should be longer than 5 minutes, and most desirably is within the range of from about 10 minutes to about 45 minutes.

In the upper portion of the fractionating column, above the level of introduction of liquid feed, the ascending mixture of steam and impurities volatilized from the liquid feed to the column is contacted with a small amount of liquid water continuously introduced into the column at or near the top of the column. By its refluxing and scrubbing action the water separates or condenses from the ascending vapors the greater part of any hydrogen peroxide vaporized therewith and carries the separated or condensed hydrogen peroxide downwardly through the column to the main body of aqueous hydrogen peroxide solution in the lower portion of the column. Only small amounts of water need be introduced into the upper portion of the column, for example, from about 0.05 to about 0.6 of the weight of the feed to the column. When operating the column at a weight ratio of steam to feed equal to 3.70 and at a pressure within the column of 450 mm. mercury, 98% exclusion of the hydrogen peroxide in the feed from the vaporous overhead fraction has been obtained at a weight ratio of absorbing water to feed equal to 0.418. With a weight ratio of steam to liquid feed equal to 1.81 and a weight ratio of absorbing water to feed equal to 0.128, there has been realized 97% exclusion of the hydrogen peroxide from the vaporous overhead fraction from the column. Of the carbon contained in the feed to the fractionating column employed in the second principal step of the process, as much as 70% to 80% typically is removed in the second principal step of the process, giving as bottoms product an aqueous 5 to 35%, preferably 15 to 30%, by weight aqueous solution of hydrogen peroxide from which substantially all of the organic impurities of high and intermediate volatility as well as less volatile but unstable impurities have been removed.

*The third principal step*

In the third principal step of the process hydrogen peroxide is separated, by vaporization, from substantially non-volatile impurities which are present under conditions at which further degradation of the organic impurities is held to a minimum. Additionally, volatile impurities having only a low but measurable volatility are separated from the evolved vapors by condensing a small proportion of the evolved vapors to yield as condensate an aqueous solution of hydrogen peroxide more concentrated in water than the solution contained in the evaporator, passing the condensate with refluxing and reboiling countercurrently to the evolved vapors, thereafter returning the condensate to the aqueous solution of hydrogen peroxide from which the vapors were evolved, and separately condensing the remaining portion of the vaporous mixture to yield the purified solution of hydrogen peroxide. The scrubbing, washing, or extracting action of this refluxing concentrated solution of hydrogen peroxide removes from the vapors impurities which have an appreciable but low volatility and which, because of their appreciable volatility, otherwise would be carried over in undesirable amounts with the vaporous mixture of hydrogen peroxide and water into the final, more concentrated solution of hydrogen peroxide. From as little as about 0.02 up to about 0.3 (weight basis) of the evolved vapors may thus be condensed, refluxed, and returned to the evaporators, a reflux ratio (weight ratio reflux to feed) of, for example, about 0.1 leading to effective separation. Impurities, such as non-volatile inorganic impurities and organic impurities having but low volatility, thus are separated from the hydrogen peroxide and accumulate in the evaporator. These are withdrawn from the evaporator by intermittently or continuously withdrawing or purging a portion of the liquid contents of the evaporator. The rate of withdrawal or purging may correspond to from about 5% to about 25% of the feed on a weight basis, depending upon the content of impurities in the feed to the evaporator and the hydrogen peroxide concentration, the carbon content of the liquid in the evaporator being maintained preferably below about 3% by weight and most desirably below about 2%.

In practicing the third principal step of the process hydrogen peroxide and water are vaporized from a small volume of liquid maintained at constant volume by addition of the aqueous solution of hydrogen peroxide obtained from the second principal step of the process, the evolved vapors preferably are passed through an entrainment separation zone to remove and return to the body of liquid any small amounts of liquid entrained with the vapors, and the vapors are passed into a fractionating zone at or near the lower end thereof. In the fractionating zone, which may be provided by a short bubble-plate, grid tray, sieve tray, packed, or equivalent fractionating column cooled at the top, the vapors are partially condensed. The cooling may be provided by means of an internally located partial condenser positioned near the top of the column or an externally located partial condenser so arranged that the condensate is returned to the column near the top thereof, or by introduction of a small amount of water directly into the top of the column. The concentrated aqueous hydrogen peroxide solution which is formed as condensate is flowed downwardly through the column with scrubbing and refluxing of the ascending vapors by the descending liquid. The descending liquid is withdrawn from the lower end of the column, and is returned to the body of liquid from which the vapors were evolved. Uncondensed vapors are withdrawn from the top of the column and conveyed to a second fractionating zone wherein they are partially condensed to yield as liquid or bottoms fraction a solution of hydrogen peroxide more concentrated than the feed to the evaporator and as an overhead or vaporous fraction, water containing only traces of hydrogen peroxide. As the addition of liquid feed to the evaporator and the volatilization of hydrogen peroxide and water therefrom are continued, the non-volatile impurities which are contained in the feed accumulate in the liquid distilland. The impurities are removed from the system and the accumulation of dangerously high concentrations of organic materials in the liquid is avoided by continuously or intermittently withdrawing or purging a small proportion of the liquid from the evaporator. In accordance with a preferred aspect of the invention, this liquid portion withdrawn from the evaporator is subjected to a subsequent and further heat treatment, as more fully described hereinafter, so as to further degrade organic materials therein, and hydrogen peroxide and volatile conversion products are volatilized from the heat-treated mixture and recycled preferably to the second principal step of the process for recovery of the hydrogen peroxide.

In the third principal step of the invention the evaporation of hydrogen peroxide and water and the subsequent scrubbing of the vapors with condensate and condensation of the scrubbed vapors desirably are carried out under subatmospheric pressures, the preferred pressures being below 150 mm. mercury absolute and most desirably below 100 mm. mercury absolute. The residence time of the liquid feed in the evaporator should be held to a minimum in order to minimize degradation of the impurities to more volatile products. Although residence times up to about 20 minutes may be employed, it is preferably to employ residence times not over about 4 minutes. Suitably short residence times may be achieved by use of a forced-circulation evaporator or equivalent means having a capacity adequate to provide the desired low residence time.

The vaporous mixture of hydrogen peroxide and water which is evolved in the evaporator employed in the third principal step of the process, contains hydrogen peroxide and water in proportions which approximate the proportions thereof in the liquid feed to the third principal step. With a more dilute initial charge to the evaporator, as in starting-up of the process, the concentration of hydrogen peroxide in the liquid in the evaporator will build up, by the volatilization of vapors relatively rich in water, until equilibrium or steady-state conditions are reached between the concentration and absolute amount of hydrogen peroxide in the feed, and the concentrations and amounts of hydrogen peroxide in the liquid purge from the evaporator, the evolved vapors, and the concentrated solution of hydrogen peroxide which is condensed and is recycled to the evaporator. The concentration of hydrogen peroxide in the feed should be between about 5% by weight and about 35% by weight and preferably between about 15% by weight and about 30% by weight, while the concentration of hydrogen peroxide in the body of liquid desirably is maintained by adjustment of reflux to the liquid and amount of purge, between about 50% and about 85% by weight, preferably 65% to 85% by weight. The boiling point of a 67.5% by weight solution of hydrogen peroxide in water is about 66° C. under an absolute pressure of 80 mm. of mercury and the vapors in equilibrium therewith at boiling contain about 21% by weight of hydrogen peroxide. Under illustrative steady-state operating conditions the boiling liquid in the evaporator will contain about 67.4% by weight of hydrogen peroxide and the evolved vapors will contain about 24.7% by weight of hydrogen peroxide. Liquid feed, containing about 20% by weight of hydrogen peroxide will be fed to the evaporator at the rate of about 100 parts per hour. Liquid purge will be withdrawn from the evaporator at the rate, for example, of about 5.9 parts per hour. The evolved vapors, after passing through the detraining zone, will be partially condensed so that, say, about 15.8% by weight of the vapors are refluxed and returned to the evaporator as an about 66.7% by weight solution of hydrogen peroxide. Under these conditions there is withdrawn as vaporous fraction from the refluxing and scrubbing zone about 94.1 parts per hour of vapors containing about 17% by weight of hydrogen peroxide. Said vaporous fraction may be partially condensed to yield a more concentrated solution of hydrogen peroxide or if desired may be fully condensed to yield an aqueous solution having the same hydrogen peroxide concentration as the vapors.

The fourth, subsidiary step

The liquid fraction withdrawn from the evaporator in the third principal step of the process comprises a concentrated (e. g., 65% to 85% by weight) aqueous solution of hydrogen peroxide containing non-volatile inorganic impurities as well as non-volatile organic impurities and organic impurities of but low volatility. The hydrogen peroxide contained in this liquid fraction may amount to an appreciable proportion, typically from about 5% to about 20% of the hydrogen peroxide fed to the third principal step of the process. According to a preferred embodiment of the invention the hydrogen peroxide contained in this concentrated liquid fraction is purified and recovered by heat-treating the liquid fraction so as to degrade, decompose, or convert the non-volatile organic impurities and the organic impurities of but low volatility at least in part to different organic materials which are more volatile and which are separable from hydrogen peroxide in the second principal step of the process, and recycling at least a fraction of the thusly heat-treated liquid fraction containing hydrogen peroxide and such more volatile organic materials, to a step of the process at least as early in the process as the second principal step. In carrying out the heat-treatment according to the invention the liquid fraction may be introduced into and held in a heated tank or other suitable vessel at temperatures preferably within the range of from about 60° C. up to 170° C. or more and for times varying from about 5 minutes up to an hour and more to convert at least a substantial portion of the organic impurities to more volatile organic materials. The heat-treated material then is recycle preferably to the second principal step of the process. A small proportion of the heat-treated material preferably is withdrawn to avoid accumulation in the system of non-volatile or but slightly volatile organic impurities. According to a preferred method, steam may be passed in intimate contact with the liquid fraction undergoing heat-treatment so as to separate or strip from the fraction hydrogen peroxide and the more volatile organic products formed by the heat treatment, and only the vaporous fraction thus obtained may be recycled, the remaining liquid fraction, comprising inorganic impurities and nonvolatile and but slightly volatile organic impurities being discarded.

The drawings

Apparatus and procedures suitable for carrying out the process of the invention in two of its specific modifications may be explained with reference to Figures 2 and 3, wherein the pieces of equipment are shown schematically in elevation and partial cross section. The drawings are to no scale. In the interest of avoiding unnecessary detail in the drawings, there have been omitted from the drawings accessory equipment, such as pumps, heat-exchangers, valves, measuring and control devices, storage tanks, and the like, which are necessary but which can be supplied where required by those skilled in the art. It also will be appreciated by those skilled in the art that, whereas fractionating columns, reboilers and reflux condensers, etc., have been shown in the drawings as separate units, it may be expedient and structurally desirable to include two or more of the individual columns in a single shell or to construct a single column in the form of two or more separate units, and to employ, for example, internal condensers and/or reboilers rather than the external condensers and reboilers shown. It will be appreciated that the process can be conducted in apparati which differ in various respects from that shown in the drawings.

Figure 2:
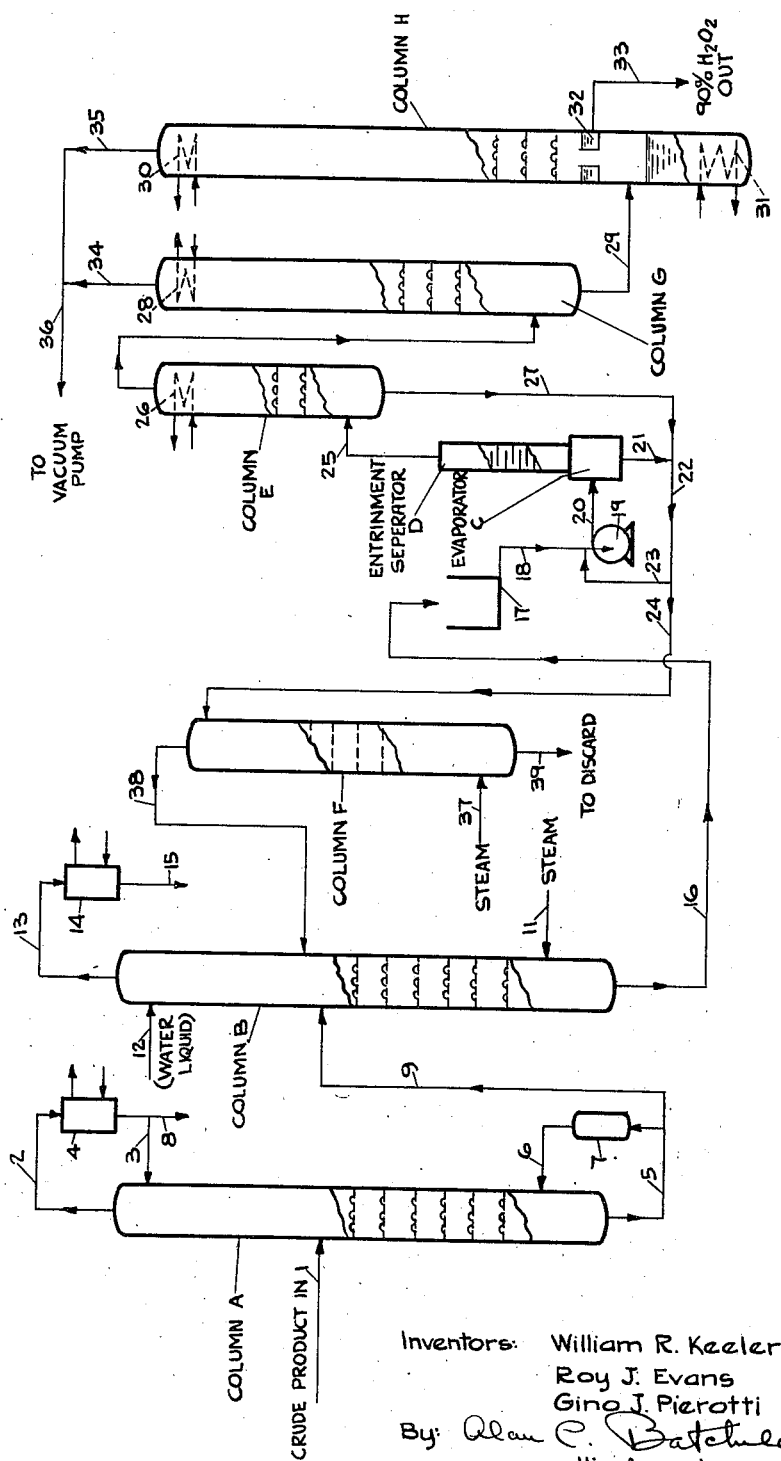
Figure 2 represents a flow diagram illustrative of one specific embodiment of the process of the invention.

Referring to Figure 2, in the apparatus there shown the first principal step of the process is carried out in column A. The second principal step is carried out in column B. The third principal step of the process is carried out in evaporator C in association with detrainer D and column E. Liquid fraction withdrawn from evaporator C is further heat-treated in column F and hydrogen peroxide together with volatile organic materials generated by such further heat treatment are vaporized in column F by contact with steam and are recycled to the second principal step of the process (column B). Concentration of the purified hydrogen peroxide to 90% by weight is carried out in columns G and H.

In carrying out the process according to the embodiment shown in Figure 2, the crude product obtained by partial oxidation of, for example, isopropyl alcohol, is introduced into column A by feed line 1. Column A may be a fractionating column of conventional form, such as a grid-tray column, designed for effecting separation between the aqueous azeotrope of the alcohol and water. Thus, with oxidation products prepared by partial oxidation of isopropyl alcohol column A should be designed in known manner for separation between the isopropyl alcohol-water binary azeotrope and water. Column A may be, for example, a 40-plate grid-tray column constructed of or lined with glass, porcelain, or other inert material and may be connected via lines 2 and 3 with water-cooled reflux condenser 4 and via lines 5 and 6 with steam-heated reboiler 7. Column A has a capacity, in terms of liquid feed in the column and reboiler at any instant, such that the residence time of the liquid portion of the feed descending through the column from inlet 1 and contained in the reboiler can be maintained between 5 and 100 minutes and preferably between 10 and 30 minutes. By means of a vacuum pump (not shown) a reduced pressure is maintained within column A. The pressure is adjusted according to the particular feed to the column so that the temperature at the reboiler will be between 85° C. and 120° C., preferably 90° C. to 110° C.

The alcohol-water azeotrope, together with by-product carbonylic compound introduced in the feed and volatile organic impurities initially present in the feed and those volatile products formed in the column by degradation of less volatile impurities, are withdrawn as distillate fraction via outlet 8. The remaining aqueous solution of hydrogen peroxide is withdrawn via conduit 9 and conveyed thence to column B.

Column B is a fractionating column of conventional design and may be, for example, a 40-plate bubble-plate column constructed of or lined with glass, porcelain, or other inert material, or it may be a column packed with Raschig rings, etc. It is provided with inlet 11 for steam and inlet 12 for liquid water. Vaporous effluent from column B is withdrawn via outlet 13 and may be condensed by means of condenser 14 and discharged at 15. In column B liquid feed descending from the level of inlet 9 is heated and intimately contacted with steam introduced at inlet 11. In order to provide sufficient time for the desired conversions of organic impurities to take place within column B and for the separation of the products of the conversion from the feed, column B is designed to have a liquid capacity sufficient to provide a residence time of the feed within the column between 5 minutes and one hour, and preferably between 10 minutes and 45 minutes. Depending upon the dimensions of the column, the rate of feed, etc., one or more trays with large liquid capacity may be provided within the column. Alternatively, liquid descending from one plate to the next lower plate may be collected and passed via suitable conduits (not shown) into and through a heated time-tank (also not shown) located exteriorly to the column and after heating therein for the requisite time returned to the column.

The aqueous hydrogen peroxide solution, from which the impurities of intermediate volatility now have been removed, is withdrawn from column B via conduit 16 and conveyed to tank 17. Tank 17 is connected via descending conduit 18, pump 19, and conduit 20 to forced-circulation evaporator C. Evaporator C preferably is a low residence time forced-feed climbing-film evaporator through which distilland is circulated by means of pump 19. The residence time of the distilland, calculated from the liquid capacity of the evaporator and the rate of input of feed through conduit 18, may be, for example, about 2½ minutes. Entrained liquid is separated from the evolved vapors in entrainment separator D and the concentrated (65–85%) aqueous hydrogen peroxide remaining from the evaporation is recirculated via conduits 21, 22, 23, pump 19, and conduit 20 to evaporator C. A small proportion, based upon the feed introduced via conduit 18, is withdrawn via conduit 24 so as to maintain a suitable low level of organic as well as inorganic impurities in the circulating concentrated aqueous hydrogen peroxide.

The vaporous mixture of hydrogen peroxide and water obtained from entrainment separator D is introduced via conduit 25 into fractionating column E. Column E may be a short column of conventional design and may be, for example, a bubble-plate column having from six to nine plates and provided with internal water-cooled condenser 26. The vapors introduced into column E are partially condensed at condenser 26. The liquid condensate flows downwardly through the column, with refluxing and reboiling at the several levels thereof, and is returned from column E via conduit 27 to the distilland in evaporator system 19, 20, 21, 22, 23 and evaporator C.

For the preparation of concentrated hydrogen peroxide, such as hydrogen peroxide at concentrations upwards from 85%, there are provided columns G and H. Column G is equipped with internal partial condenser 28. Column H is connected to receive liquid product from column G via line 29 and is provided with internal cooling coils 30, internal heating coils 31, catch tray 32 and outlet 33. Columns G and H may be connected through overhead conduits 34 and 35, respectively, and conduit 36 to means for maintaining reduced pressures in the column. In column G the vaporous mixture of hydrogen peroxide and water is fractionated to yield a liquid fraction containing about 50% by weight of hydrogen peroxide and a vaporous fraction consisting essentially of water. The vaporous fraction is withdrawn via conduit 34 and the liquid fraction is conveyed via conduit 29 to column H. In column H the liquid fraction from column G is further fractionated to yield as vaporous fraction water containing only traces of hydrogen peroxide and as liquid fraction concentrated hydrogen peroxide containing upwards from 85% hydrogen peroxide. Heat is supplied to column H by steam or other source of heat introduced, for example, by heating coils 31 submerged in a quantity of condensate maintained in the lower end of the column. The concentrated hydrogen peroxide is collected in catch tray 32 and is continuously withdrawn via outlet 33.

The liquid fraction withdrawn from the evaporator system 19, 20, 21, 22, 23 and evaporator C via conduit 24 is introduced into the upper end of column F. Column F may be, for example, a 10-plate grid tray column maintained at an internal pressure of about 200 to 400 mm. mercury. Steam is introduced near the lower end of the column via inlet 37. In column F said liquid fraction is heated during its passage downwardly through the column. The column is designed to have a capacity such that the residence time of the liquid passing downwardly therethrough is, for example, about from about 10 to about 45 minutes. Organic impurities present in the feed to column F are in part degraded to more volatile organic products and such more volatile organic products together with hydrogen peroxide are taken overhead via conduit 38 and returned to column B wherein their separation is effected. Non-volatile, relatively stable organic impurities not degraded during the heat treatment in column F, together with inorganic impurities, stabilizer, etc., are discharged in the liquid fraction from column F via line 39.

Figure 3:
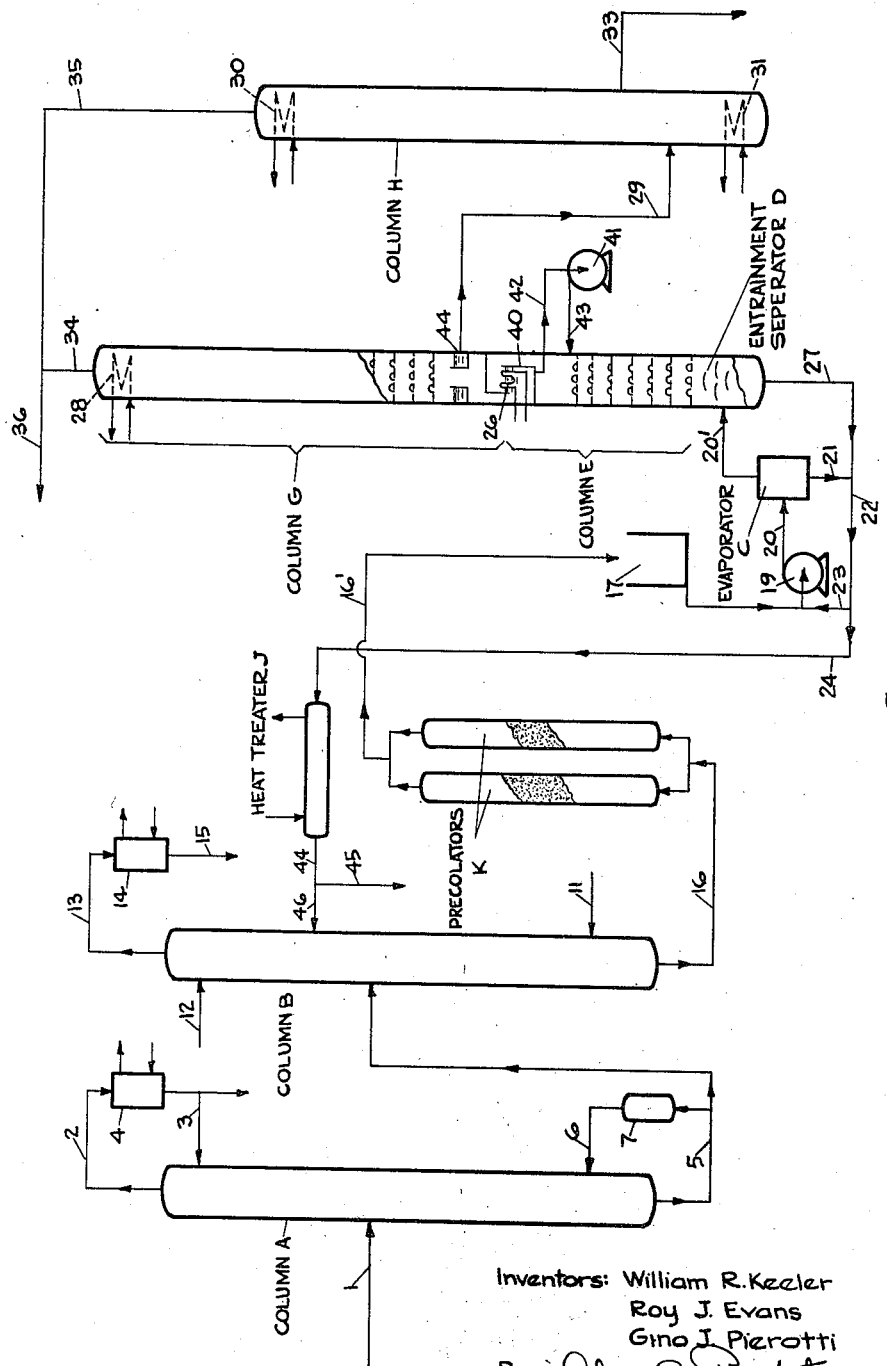
Figure 3 represents a flow diagram illustrative of a second specific embodiment of the process of the invention.

Referring to Figure 3, the first two principal steps of the process are carried out in columns A and B, respectively. The third principal step is carried out in evaporator C in conjunction with entrainment separator D and column E. Concentration of the hydrogen peroxide is carried out in columns G and H. Degradation of non-volatile impurities contained in the concentrated solution of hydrogen peroxide obtained from evaporator C is carried out in heat treater J and the heat-treated concentrated solution is returned to column B for removal of the volatile products formed by the heat-treatment and for ultimate recovery of the hydrogen peroxide. Liquid effluent from column B is treated in percolators K with an ion-exchange resin to remove traces of metal ions with which the effluent may have become contaminated by incidental contact with metallic pieces of equipment. Percolators K may be provided with suitable piping, valving, and other appropriate means (not shown in the drawing) for washing, regenerating, backwashing, etc., the resin bed according to known methods. As the ion-exchange resin there may be employed known types of resins, such as the sulfonated phenol-aldehyde cation-exchange resins sold by the Dow Chemical Company under the trade name Dow X–50 resin.

Columns E and F are shown in Figure 3 to be arranged in a single shell. Catch-tray 40 with pump 41 and associated conduits 42 and 43 may be provided to ensure return of condensate at a controlled measured rate to the upper end of column E. Liquid effluent from column F is collected on catch-tray 44 and withdrawn via conduit 29.

In heat treater J the liquid fraction which is separated in the third principal step of the process is heated in liquid state whereby organic impurities which are non-volatile or have but low volatility are degraded, converted, or decomposed, in part by reaction with hydrogen peroxide, to more volatile organic products. Heat treater J may be, for example, a tube and shell heater, heat being supplied by steam or other heat-transfer fluid, with dimensions determined by the desired residence time of the liquid fraction in the heat treater. Alternatively, a suitable heated time-tank or equivalent means may be provided. A small fraction of the heated treated liquid withdrawn from heat treater J may be withdrawn via outlet 45 to remove non-volatile inert impurities, and the remainder of the heat-treated liquid fraction recycled to column B via conduit 46.

*Specific example*

The following example will serve further to illustrate the invention in one of its specific embodiments. In the example the parts are parts by weight and the percentages are percentages by weight unless otherwise specified.

Crude oxidation product containing hydrogen peroxide was prepared by partial oxidation of isopropyl alcohol according to the methods of copending applications of Rust and Vaughan, Serial No. 130,852, filed December 2, 1949, and of Rust, Vaughan and Porter, Serial No. 180,694, filed August 21, 1950. The crude oxidation product had the following approximate composition (anhydrous basis):

| Component: | Percent |
|---|---|
| Isopropyl alcohol | 72 |
| Acetone | 10 |
| Total active oxygen, as $H_2O_2$ | 9.4 |
| Esters, aldehydes, acids and other oxygenated organic compounds, as carbon based on the active oxygen as $H_2O_2$ | 2.2 |
| Organic peroxides, as $H_2O_2$ | 3.9 |
| $H_2O_2$ | 5.5 |
| Potassium pyrophosphate | 0.002 |

To the crude product there was added deionized water in an amount sufficient to give a diluted product containing about 27% of water, or about 4.2 parts of water per part of active oxygen expressed as $H_2O_2$, and an additional 0.005% of potassium pyrophosphate. The diluted product was continuously fed into an all-glass fractionating column having 35 perforate plates and provided with water-cooled reflux condenser and steam-heated reboiler, the feed being introduced at the 20th plate from the bottom. The rate of feed was adjusted to give a residence time of the liquid feed in the column and reboiler of about 16 minutes, the following conditions being maintained in the column: temperature at top, 68°; pressure at top, 480 mm. mercury; temperature at bottom, 93° C.; reflux ratio (reflux/product) 0.5. The liquid fraction continuously withdrawn from the bottom of the column contained 98.1% of the active oxygen in the feed as an about 27.5% aqueous solution of hydrogen peroxide. The distillate or overhead fraction from the column contained 67.5% isopropyl alcohol, 16.9% acetone, 15.2% water, and small amounts of organic esters, aldehydes and acids.

The aqueous hydrogen peroxide solution thus obtained in the first principal step was continuously fed into an all-glass 40-plate bubble-plate column at the 24th plate from the bottom at a rate equivalent to a residence time of the liquid feed within the column equal to about 40 minutes. There also was introduced into the column at about the level of introduction of said liquid feed, the liquid recycle stream hereinafter described. Steam was introduced into the bottom of the column at the rate of about 2 parts per part of liquid feed and liquid water was introduced simultaneously into the top of the column at the rate of about 1 part per 10 parts of liquid feed. The column was operated under the following conditions: pressure at top, 430 mm. mercury; temperature at top, 85° C.; temperature at bottom, 93° C. Gaseous effluent withdrawn from the top of the column contained, besides water, a mixture of organic acids, aldehydes, esters, and other volatile oxygenated organic compounds equal to about 3–4% by weight of the hydrogen peroxide fed to the column. Liquid effluent withdrawn from the bottom of the column was an about 19.5% aqueous solution of hydrogen peroxide containing organic materials in an amount equivalent to about 0.1–0.2% by weight of carbon.

In the third principal step the liquid effluent from the column used in the second principal step was continuously introduced into and flash evaporated under about 80 mm. mercury pressure from a small substantially constant volume of about 70% aqueous hydrogen peroxide circulated through a steam-heated low residence time forced feed evaporator. The residence time of the feed was about 1¼ minutes. The evolved vapors were passed upwardly through a short length of tubing provided with baffles so as to remove and return to the evaporator entrained liquid, and thence into the lower end of a 9-plate grid-tray fractionating column. By means of an internally-located partial condenser positioned at the top of the fractionating column an about 67% solution of hydrogen peroxide was condensed from the vapors and flowed downwardly through the column, thereby scrubbing, washing, or extracting the ascending vapors with refluxing and reboiling at the several levels of the column. The concentrated aqueous hydrogen peroxide issuing from the lower end of the column was continuously returned to the evaporator. The vaporous fraction issuing from the top of the column was fractionated first in a 6-plate all-glass bubble-tray fractionating column to yield a 50% aqueous solution of hydrogen peroxide, water being withdrawn as the vaporous overhead fraction from the column, and the 50% aqueous solution then was fractionated in a 10-plate all-glass bubble-tray column to yield 90% hydrogen peroxide. The 90% hydrogen peroxide was optically clear, colorless and stable. The overall recovery as hydrogen peroxide of the active oxygen in the original feed was about 85%.

There was continuously withdrawn from the circulating body of concentrated hydrogen peroxide in the evaporator system a stream equal in hydrogen peroxide content to 15–20% of the feed to the evaporator system. This stream was passed downwardly through a 10-plate grid-tray column maintained at an internal pressure of 250 mm. mercury at a rate equivalent to a residence time within the column of about 20 to 30 minutes. Steam was simultaneously introduced into and flowed upwardly through the column at a rate, in weight units, 16 times the rate of introduction of liquid feed. Of the organic impurities present in the feed 37% was converted to more highly volatile organic products and 12% was oxidized to carbon dioxide. The vaporous overhead fraction from the column, which fraction contained the volatile organic materials together with hydrogen peroxide, was recycled to the fractionating column used in the second principal step. The liquid fraction remaining after removal of the volatile organic products and the hydrogen peroxide, was withdrawn from the lower end of the column and discarded.

It will be appreciated that the invention is susceptible to modification within the letter and spirit of the appended claims and that it is desired to claim the invention as broadly as the prior art permits.

We claim as our invention:

1. In the recovery and purification of hydrogen peroxide existing in a mixture of the character hereinafter defined, said mixture comprising in predominant amount water-soluble, low molecular weight alcohol and the corresponding low molecular weight carbonylic compound, each distilling in the presence of water at a temperature lower than water alone, and water, and in minor amount hydrogen peroxide and oxygenated organic compounds comprising unstable organic peroxygen compounds, the method which comprises in an initial step degrading by heat treatment a portion of the organic peroxygen compounds to relatively stable organic products having volatilities greater than that of water and distilling from the heat-treated mixture in the presence of water the alcohol and corresponding carbonylic compound together with water and at least a substantial portion of said relatively stable organic products, in a subsequent step degrading by further heat treatment in the presence of added steam a further portion of the organic peroxygen impurities remaining to additional relatively stable organic products, said additional products having volatilities in the presence of water greater than that of the hydrogen peroxide, while simultaneously therewith volatilizing said additional organic products together with water from the mixture undergoing heat-treatment, and thereafter evaporating hydrogen peroxide together with water at a pressure below 150 mm. mercury absolute and with a residence time for the liquid feed in the evaporator of not more than about 20 minutes so as to separate overhead the evaporated hydrogen peroxide from the hydrogen peroxide solution containing the substantial amount of relatively stable but relatively non-volatile organic impurities remaining after said step of degrading impurities in the presence of added steam under conditions non-conducive to degradation of the organic impurities remaining, and condensing the evaporated hydrogen peroxide and water to the liquid state.

2. The process defined by claim 1 in which the alcohol is isopropyl alcohol and the corresponding carbonylic compound is acetone.

3. In the recovery and purification of hydrogen peroxide existing in a mixture of the character hereinafter defined, said mixture comprising in predominant amount water-soluble, low molecular weight alcohol and the corresponding low molecular weight carbonylic compound, each distilling in the presence of water at a temperature lower than water alone, and water, and in minor amount hydrogen peroxide and oxygenated organic compounds comprising unstable organic peroxygen compounds, the method which comprises: subjecting the mixture to continuous rectification in a first distillation zone in the presence of an amount of water at least equal to the sum of that required for formation of the binary alcohol-water azeotrope of the alcohol plus an amount equal to frm about 1.8 to about 19 times the weight of active oxygen, expressed as hydrogen peroxide, contained in the mixture, the distillation being conducted at a maximum temperature of the distilland between about 75° C. and about 120° C. with a residence time of the distill and in the distillation zone between about 5 minutes and about 100 minutes, thereby separating the mixture into a first vaporous fraction comprising alcohol, carbonylic compound corresponding thereto, and water, and a first liquid fraction containing hydrogen peroxide, water, and small amounts of oxygenated organic compounds less volatile than the alcohol; in a second rectification zone subjecting said first liquid fraction to stripping with added steam at a temperature between about 65° C. and about 100° C. at a residence time of said first liquid fraction in said second rectification zone between about 5 and about 90 minutes, thereby separating said first liquid fraction into a second vaporous fraction and, as second liquid fraction, an aqueous solution of hydrogen peroxide; and thereafter rapidly volatilizing hydrogen peroxide and water from said second liquid fraction, while suppressing degradation of organic impurities remaining in said second liquid fracton, to yield a third vaporous fraction comprising a vaporous mixture of hydrogen peroxide and water and a third liquid fraction comprising a concentrated aqueous solution of hydrogen peroxide, separating said third vaporous fraction from said third liquid fraction, scrubbing the third vaporous fraction with a concentrated aqueous solution of hydrogen peroxide richer in water than said third liquid fraction, and thereafter condensing at least the hydrogen peroxide content of the third vaporous fraction to the liquid state.

4. The process defined by claim 3 in which the aqueous solution of hydrogen peroxide used in scrubbing the third vaporous fraction is admixed after the scrubbing operation with the third liquid fraction, the mixture is subjected to a separate heat treatment so as to convert non-volatile organic materials and organic materials of low volatility contained in the mixture at least in part to more volatile organic products, and at least hydrogen peroxide and said more volatile organic products are recycled to the second rectification zone.

5. In a process for the recovery and purification of hydrogen peroxide produced by partial oxidation of a water-soluble, low molecular weight alcohol under conditions productive of a crude mixture comprising unconsumed alcohol, the corresponding carbonylic compound, hydrogen peroxide, and minor amounts of soluble oxygenated organic compounds and wherein unconsumed lower alcohol and by-product carbonylic compound have been volatilized from the crude mixture to leave a liquid fraction comprising an aqueous hydrogen peroxide solution containing residual but appreciable quantities of said oxygenated organic compounds, the method of enhancing the separability of said oxygenated organic compounds from hydrogen peroxide and effecting at least in part the separation, which method comprises contacting said liquid fraction and added steam countercurrently at a temperature of from about 65° C. to about 100° C. for a contact time between about 5 and about 60 minutes to convert and take off with the steam a portion of said oxygenated organic impurities from aqueous hydrogen peroxide containing a substantial amount of relatively non-volatile organic impurities and then separately distilling said hydrogen peroxide containing relatively non-volatile organic impurities at a pressure below 150 mm. mercury absolute and with a residence time for the liquid feed of not more than about 20 minutes to take off purified hydrogen peroxide and water in vapor form from a concentrated aqueous solution of hydrogen peroxide containing said relatively non-volatile organic impurities.

6. In the recovery of hydrogen peroxide from a crude liquid product of partial oxidation of a water-soluble lower aliphatic alcohol under conditions productive of hydrogen peroxide and the carbonylic compound corresponding to the alcohol, the method which comprises distilling from the crude liquid product in a first rectification zone in the presence of water a vaporous mixture comprising water, alcohol, and the corresponding carbonyl compound to leave an aqueous solution containing between about 5% and about 35% by weight of hydrogen peroxide, in a second rectification zone contacting said aqueous solution countercurrently with a stream of steam at a temperature between about 65° C. and about 100° C. and a residence time of the aqueous solution in the rectification zone within the range of about 10 minutes to about 45 minutes, withdrawing steam together with volatilized impurities from the upper end of said second fractionating zone and a partially purified aqueous solution of hydrogen peroxide from the lower end of said second fractionating zone evaporating said partially purified hydrogen peroxide solution to take off purified hydrogen peroxide and water in vapor form and as bottoms product a concentrated aqueous solution of hydrogen peroxide containing remaining oxygenated organic impurities, and condensing said vapors to obtain purified hydrogen peroxide solution.

7. In the recovery of hydrogen peroxide from a crude liquid product of partial oxidation of a water-soluble lower aliphatic alcohol under conditions productive of hydrogen peroxide and the carbonylic compound corresponding to the alcohol, the method which comprises distilling from the crude liquid product in a first rectification zone in the presence of water a vaporous mixture comprising alcohol, corresponding carbonylic compound, and water to leave an aqueous solution containing between about 5% and about 35% by weight of hydrogen peroxide, introducing a stream of said aqueous solution into a second rectification zone at an intermediate level thereof and a stream of steam into said second rectification zone at a level below the level of introduction of the aqueous solution, the amount of steam being between about 0.4 and about 5 times the weight of said solution, contacting the solution countercurrently with the steam within said rectification zone at a temperature maintained between about 65° C. and about 100° C. and for a time of contact within the range of about 10 minutes to about 45 minutes, withdrawing steam together with volatilized impurities from the upper end of said fractionating zone and a partially purified aqueous solution of hydrogen peroxide from the lower end of said second fractionating zone evaporating said partially purified hydrogen peroxide solution to take off purified hydrogen peroxide and water in vapor form and as bottoms product a concentrated aqueous solution of hydrogen peroxide containing remaining oxygenated organic impurities, and condensing said vapors to obtain purified hydrogen peroxide solution.

References Cited in the file of this patent
UNITED STATES PATENTS

| | | |
|---|---|---|
| 2,298,064 | MacMullin | Oct. 6, 1942 |
| 2,461,988 | Jooijman | Feb. 15, 1949 |
| 2,479,111 | Harris | Aug. 16, 1949 |
| 2,520,870 | Wood et al. | Aug. 29, 1950 |

OTHER REFERENCES

Maass et al.: "Journal of the American Chemical Society," vol. 42, pages 2548–2250 (1920).